United States Patent Office 3,133,945
Patented May 19, 1964

3,133,945
COPPER COMPLEXES OF N-(2-AMINO-HYDRO-CARBYL) SULFONAMIDES
John H. Billman, Bloomington, Ind., Nicholas S. Janetos, Providence, R.I., and Robert Chernin, Bronx, N.Y., assignors to Indiana University Foundation, Bloomington, Ind.
No Drawing. Filed Feb. 8, 1961, Ser. No. 87,770
9 Claims. (Cl. 260—438)

This invention relates to a novel group of copper chelates and to novel processes utilizing these copper chelates.

Many compounds have been found which form chelate compounds with copper, as for example, glycine, ethylenediamine and citric acid. Most of these compounds have been quite non-specific in that they form chelate compounds with many other metals in addition to copper. Furthermore, most of the compounds of the prior art form soluble copper chelates. Thus, when copper is present in small amount compared to that of other metals, these other metals displace copper from the soluble chelate compound by the principle of mass action. The few compounds which form insoluble copper chelates, such as 8-hydroxyquinoline, are extremely non-specific, precipitating numerous other metals as chelate compounds so that this group of chelating agents is nearly useless for the quantitative estimation of copper in mixtures of metals.

It is an object of this invention to provide a novel group of insoluble copper chelates which are suitable for the qualitative and quantitative determination of copper by colorimetric, gravimetric and amperometric procedures. It is a further object of this invention to provide a novel qualitative and quantitative method for the detection of copper ions in solution in the presence of other metal ions. It is a still further object of this invention to provide a novel process for the removal of only copper ions from solution containing multiple metal ions.

In fulfillment of the above and other objects, this invention provides a novel type of copper chelate in which the cupric ion is chelated with an N-(2-amino-hydrocarbyl) sulfonamide. In forming a chelate with an N-(2-amino-hydrocarbyl) sulfonamide the cupric ion displaces the remaining acidic hydrogen from the amide nitrogen while the β-amino group forms a coordinate bond with the same cupric ion. Thus, the novel chelates of this invention contain the following characteristic grouping of atoms:

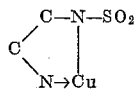

In the above schematic representation, only the essential atoms are present, and the coordinate bond between the copper ion and amine nitrogen is shown by an arrow.

The cupric ion under most conditions is a tetra-covalent ion; that is, it can form covalent or coordinate bonds with 4 groups. Thus, since β-amino substituted sulfonamides are potential bidentate compounds, two molecules are ordinarily present for each cupric ion in the novel copper chelates of this invention, which chelates are represented schematically in the following structure:

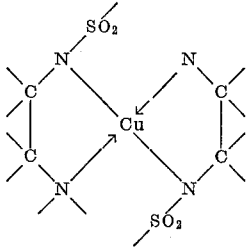

In accordance with the novel processes of this invention, copper chelates having the above characteristic groupings are formed by reacting cupric ions with an aryl or alkyl sulfonamide substituted on the amide nitrogen with a beta amino hydrocarbyl group. Compounds having the above structural characteristics which are capable of forming stable chelates with copper ions can be represented by one of the following formulas:

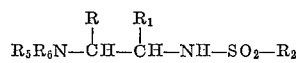

and

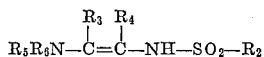

wherein $R_2$ is alkyl, such as methyl, ethyl, propyl, butyl, octyl and the like, or aromatic such as phenyl, naphthyl and their substituted derivatives, furyl, thienyl and the like, and aralkyl such as benzyl, phenyl-ethyl and substitution products of these groups and the like. R and $R_1$ are hydrogen or a lower alkyl group such as methyl, ethyl, propyl and the like or an aralkyl group such as benzyl and the like or an aryl group such as benzyl, naphthyl and substitution products thereof, $R_5$ is hydrogen, a lower alkyl group such as methyl, ethyl, propyl and the like or an aralkyl group such as benzyl, phenethyl and the like, $R_6$ is hydrogen, a lower alkyl group such as methyl, ethyl, propyl, and the like or an aralkyl group such as benzyl, phenethyl and the like or an aromatic group such as phenyl, α-naphthyl, β-naphthyl, furyl, thienyl and the like, $R_5$ and $R_6$ taken together are a pentamethylene chain so as to complete a piperidine ring and wherein $R_3$ and $R_4$ taken together are the atoms necessary to complete a carbocyclic aromatic ring system such as a benzene or naphthalene ring system.

In the above formulas, when $R_2$, or $R_6$ represents an aromatic group one or more of the following substituents can be present in the aromatic ring: a halogen such as chlorine or bromine, an alkyl group such as methyl or ethyl, an aryl group such as phenyl, an aralkyl group such as benzyl, a nitro group, a carbalkoxy group, an alkoxy group such as methoxy or ethoxy, a methylene dioxy group, a hydroxy group, an amino group, an acyl amino group, an alkyl substituted amino group and the like. Thus, $R_2$ or $R_6$ can be, illustratively, chlorophenyl, bromonaphthyl, anisyl, tolyl, xylyl, o-chlorotolyl, naphthyl, nitronaphthyl, p-benzylphenyl and acetamidophenyl.

The following list of compounds illustrates the type useful in forming the copper-chelates of this invention having the structures set forth above: o-(N-methanesulfonamido) aniline, N-benzenesulfonyl-1,2-diaminopropane, o-(p-chlorobenzenesulfonamido) N,N-dimethylaniline, N-benzene-sulfonyl derivative of ethylenediamine, o-(m-nitrobenzenesulfonamido) N-ethylaniline, N-cyclohexylsulfonyl-N'-propyl-1,2-diaminopentane, N - methanesulfonyl-N'-ethyl - N' - (4 - acetamido - 3 - methylphenyl) ethylenediamine and N-(o-methoxyphenylsulfonyl) 2,3-diaminobutane.

When two molecules of a chelating agent as represented by the above formula and as illustrated by the above examples, reacts in solution with a cupric ion, the resulting copper chelate can be represented by one of the following structures.

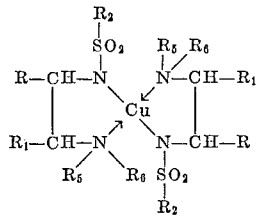

and

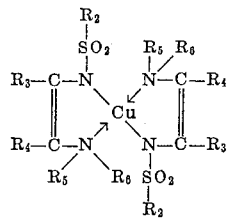

wherein R, $R_1$, $R_2$, $R_3$, $R_4$, $R_5$, and $R_6$ have the same significance as hereinabove.

In the novel processes of this invention, two molecules of an N-(2-amino-hydrocarbyl) sulfonamide react with a cupric ion in solution to give a colored complex. Thus, applicants' novel processes can be employed as a qualitative test for copper ions. Furthermore, under carefully controlled conditions, the amount of a copper complex having the above structure and formed by the processes of this invention can be determined quantitatively using colorimetric, gravimetric, amperometric or other similar procedures. In addition, the formation of a copper chelate in accordance with the processes of this invention, effectively ties up cupric ions so that they are no longer available for chemical reactions, as for example, to catalyse the oxidation of bisulfite ion by molecular oxygen.

A preferred group of chelating agents coming within the scope of this invention are those derived from o-phenylene diamine. This preferred group of chelates are prepared by reacting copper ions with a chelating agent having the following structure:

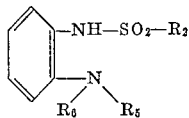

wherein $R_2$, $R_5$, and $R_6$ have the same significance as hereinabove. These compounds form generally water insoluble chelates with cupric ions, said chelates generally containing two molecules of chelating agent per cupric ion. These insoluble copper chelates are eminently suitable for the quantitative precipitation of copper ions from solutions thereof, and also for the quantitative gravimetric, colorimetric, amperometric or potentiometric estimation of copper in ores, alloys etc. since this preferred group of chelating agents are nearly specific for copper ions. Furthermore, the insoluble copper chelates thus formed can be separated easily from solution and then dried to constant weight. Furthermore, by the use of a few simple and standard inorganic separation procedures, copper can be quantitatively determined as an insoluble chelate in a wide variety of ores, alloys and other mixtures. For example, copper can be determined quantitatively by the processes of this invention in bronzes, brasses, aluminum alloys, magnesium alloys, manganese alloys, copper ore, silver ores, zinc alloys, beryllium alloys and the like.

The specificity of the preferred group of chelating agents of this invention for cupric ions, those derived from o-phenylenediamine, is set forth below using o-(p-tolylsulfonamido) aniline for illustrative purposes. As can be seen from the results set forth in Table I below o-(p-tolylsulfonamido) aniline gives no precipitate with 0.1 molar solutions of ions of metals of the alkaline earth group such as barium or strontium, of ions of group II metals such as zinc or cadmium, of ions of group III metals such as aluminum, of ions of group IV metal such as tin or thorium, or rare earth ions such as yttrium, or ions of the transitions metals such as iron, nickel or cobalt. In fact, only silver cations give any reaction at all with o-(p-tolylsulfonamido) aniline and only silver cations can thus be classed as interfering ions. The results in Table I were obtained by adding 10 drops of a 0.1 molar solution of the metal ion to about 4 ml. of a 1% solution of o-(p-tolylsulfonamido) aniline in a 70:30 ethanol-water solvent. In Table I, column 1 gives the ion under test, column 2 the pH of the 0.1 molar metal solution and column 3, the results observed upon mixing the metal ion and organic reagent solutions.

TABLE I

| Ion | pH | Result |
|---|---|---|
| $Ba^{+2}$ | 6.5 | Clear solution. |
| $Cd^{+2}$ | 6.5 | Do. |
| $Zn^{+2}$ | 6.5 | Do. |
| $Sr^{+2}$ | 6.5 | Do. |
| $Ca^{+2}$ | 6.5 | Do. |
| $Ni^{+2}$ | 6.5 | Do. |
| $Co^{+2}$ | 6.5 | Do. |
| $Cr^{+3}$ | 6.5 | Do. |
| $Mg^{+2}$ | 6.5 | Do. |
| $Mn^{+2}$ | 6.5 | Do. |
| $Ir^{+4}$ | 6.5 | Do. |
| $Yt^{+3}$ | 6.5 | Do. |
| $Be^{+2}$ | 6.5 | Do. |
| $Cu^{+2}$ | 6.5 | green ppt. |
| $Ag^{+1}$ | 5.3 | brown film on test tube wall. |
| $Al^{+3}$ | 4.0 | clear solution. |
| $Pb^{+2}$ | 5.5 | Do. |
| $Fe^{+2}$ | 2.3 | Do. |
| $Th^{+4}$ | 2.0 | Do. |
| $Sn^{+2}$ | 1.0 | Do. |
| $Sn^{+4}$ | 2.0 | Do. |
| $Fe^{+3}$ | 1.8 | Do. |

Under the experimental conditions described above, bismuth, mercurous, mercuric and antimony ions precipitate as basic nitrates. As can be seen from Table I, silver ion is the only commonly occurring interfering cation. Separation of the above ions from solutions containing them can be easily effected, however, so that only the cupric ion of those ions remaining in solution will be capable of precipitations with an o-sulfonamido aniline reagent. For example, if a copper-containing alloy is dissolved in nitric acid, addition of a source of chloride ions such as sodium chloride will precipitate any silver ion present as an insoluble chloride which can be removed by filtration. Under these conditions, mercury is present as mercuric ion. Dilution of the filtrate serves to precipitate antimony and bismuth as the insoluble basic nitrates, also removable by filtration. Lastly, addition of a complexing agent for mercuric ion such as tartrate will prevent its co-precipitation with an insoluble cupric o-sulfonamido aniline complex. Other methods of separating the above ions prior to the quantitative removal of copper from solutions containing these ions will readily suggest themselves to those skilled in the art.

The effect of the acidity of the solution containing cupric ions upon their quantitative removal by o-(p-tolylsulfonamido) aniline was determined by adjusting the pH of aliquots of a nitric acid solution of copper using 20% sodium tartrate. The pH of the resulting solution was measured with a pH meter, and the amount of copper in the original solution was determined electrolytically. The cupric ions were precipitated by the addition of a 1% solution of o-(p-tolylsulfonamido) aniline. The precipitate of cupric di-o-(p-tolylsulfonamido) aniline was separated by filtration and was dried at about 110° C. to constant weight. The results of the determinations of copper with the above procedure at various pH's are given in Table II, column 1 gives the pH and column 2, the percent copper removed by precipitation with o-(p-tolylsulfonamido) aniline.

TABLE II

| pH: | Percent $Cu^{+2}$ removed |
|---|---|
| 3.5 | 61.85 |
| 5.2 | 92.16 |
| 6.2 | 99.92 |
| 6.5 | 99.60 |
| 7.8 | 99.60 |
| 8.5 | 99.50 |

As can be seen from Table II, above pH=6, copper ions are quantitatively removed from solution by an o-(sulfonamido) aniline.

The N-(2-amino-hydrocarbyl) sulfonamide chelates of copper coming within the scope of this invention are in general colored, the exact color being dependent upon the chromophore groups present in the chelating agent. Most of the cupric di-(N-(2-amino-hydrocarbyl)-sulfonamide) chelates have a limited solubility in water. The preferred group of chelates, the cupric chelates of o-(sulfonamido anilines) are gray to green, easily filterable, water insoluble compounds which can readily be dried to a constant weight and are not hygroscopic after drying. Both of these properties are required by a salt which is to be used for a quantitative gravimetric determination. The compounds are also insoluble in most organic solvents. They will, however, dissolve in pyridine and dimethylformamide.

The following example illustrates the method of preparation of the N-(2-amino-hydrocarbyl) sulfonamides useful in forming the upper chelates of this invention.

Preparation of o-(p-tolylsulfonamido) aniline:

A solution containing 6.9 grams of o-nitroaniline in 30 ml. of pyridine was placed in a round-bottom three-neck flask fitted with stirrer, reflux condenser and dropping funnel. 9.55 g. of p-toluenesulfonyl chloride were added thereto with stirring over a period of about 1 hour. The reaction mixture was heated for one hour at refluxing temperature and was then cooled to ambient room temperature. The reaction mixture was poured with stirring into about 50 ml. of cold water. Yellow crystals of o-(p-tolylsulfonamido) nitrobenzene formed in the above reaction, precipitated and were collected by filtration. Recrystallization of the precipitate from 95% aqueous ethanol yielded 11.8 g. of purified o-(p-tolylsulfonamido) nitrobenzene melting about 110° C.

Four grams of o-(p-tolylsulfonamido) nitrobenzene were dissolved in about 100 ml. of 95% aqueous ethanol and 0.1 g. of platinum oxide were added thereto. The mixture was placed in a low pressure hydrogenation apparatus and hydrogenated under 45 lbs. hydrogen pressure. The catalyst was separated by filtration, the filtrate was evaporated to dryness in vacuo and the resulting residue comprising o-(p-tolylsulfonamido) aniline formed in the above hydrogenation was recrystallized from 50% aqueous ethanol, yielding 2.2 g. of crystalline compound melting at about 135–6° C.

Other N-(2-amino-hydrocarbyl) sulfonamides useful in chelating copper ions which can be prepared by the above method, are listed Table III, which follows. In Table III, column 1 gives the name of N-(2-amino-hydrocarbyl) sulfonamide, column 2 the melting point of the compound and column 3, the starting material used to react with o-nitroaniline.

TABLE III

| Name of N-(2-amino-hydrocarbyl) sulfonamide | M.-P.° C. (uncorr.) | Starting Material |
|---|---|---|
| o-(Methanesulfonamido) aniline. | 104–5 | methanesulfonyl chloride. |
| o-(Benzenesulfonamido) aniline. | 165–7 | benzenesulfonyl chloride. |
| o-(2,4-dimethylbenzene sulfonamido) aniline. | 86–8 | 2,4-dimethylbenzenesulfonyl chloride. |
| o-(2,5-dimethylbenzene sulfonamido) aniline. | 113–14 | 2,5 dimethylbenzenesulfonyl chloride. |
| o-(3-nitrobenzene sulfonamido) aniline. | 129–30 | m-nitrobenzenesulfonyl chloride. |
| o-(3-carboxybenzene sulfonamido) aniline. | 223–223.2 | m-carboxybenzenesulfonyl chloride. |
| Bis ((N-o-anilino) 3-sulfonamido) diphenylsulfone. | | bis(3-chlorosulfonyl) diphenylsulfone. |

In addition to preparing chelating agents of the above type by the preparative methods set forth above it is also possible to prepare resins containing the N-(2-amino-hydrocarbyl) sulfonamide grouping by taking a sulfonic acid resin, forming the sulfonyl chloride derivative of the resin and then reacting the chloride with a compound containing a 1,2-diamine grouping. Conversely, a resin containing vicinal amino groups could be reacted with a sulfonyl chloride to form a copper chelating resin having the required N-(2-amino-hydrocarbyl) sulfonamide grouping. Other methods of making a specific copper-chelating resin will readily suggest themselves to those skilled in the art.

This invention is further illustrated by the following specific examples:

*Example 1*

GRAVIMETRIC DETERMINATION OF COPPER IN BRASS

The amount of copper in two brass alloys was determined as follows: from 0.5 to 1.0 g. of the alloy were dissolved in 2.5 ml. of 8 N nitric acid and the solution was boiled to expel nitrous fumes. The solution was diluted to 1 liter with distilled water. A 25 ml. aliquot was removed and further diluted to 150 ml. with distilled water. Ten grams of sodium tartrate were dissolved therein and the pH of the aliquot was adjusted to about 7 by the addition of a 10% sodium hydroxide solution. A 0.5% solution of o-(p-tolylsulfonamido) aniline in a 70:30 ethanol-water solvent mixture was added dropwise to the above solution, the amount of reagent added being sufficient to precipitate an amount of copper equivalent to the weight of alloy originally used. The resulting green precipitate of cupric di-o-(p-tolylsulfonamido) aniline was digested by heating on a steam bath at a temperature below 65° C. until coagulation occurred. The solution was cooled, the precipitate was separated by filtration, was washed with distilled water and was dried to a constant weight. Table V which follows gives the results of the two determinations carried out as indicated. In Table V, column 1 gives the percentage composition of each alloy and column 2, the amount of copper found.

TABLE V

| Composition of brass: | Percent copper found |
|---|---|
| Alloy #50 | 68.25 |
| Copper | 68.69 |
| Tin | 4.99 |
| Lead | 25.68 |
| Zinc | 0.92 |
| Alloy #51 | 85.66 |
| Copper | 85.22 |
| Tin | 8.14 |
| Lead | 1.10 |
| Zinc | 5.43 |
| Alloy #52 | 78.72 |
| Copper | 78.73 |
| Tin | 10.03 |
| Lead | 9.98 |

Example 2

DETERMINATION OF COPPER IN THE PRESENCE OF CADMIUM

The amount of copper in a cupric nitrate solution was determined by electrodeposition. An aliquot of this solution was diluted with a cadmium nitrate solution until the final concentration of cadmium was about 10 times that of the copper. The pH of the solution was adjusted to about 6.5 with 20% sodium tartrate. Removal of the copper by the method outlined in Example 1, was substantially quantitative.

Example 3

GRAVIMETRIC DETERMINATION OF COPPER IN VARIOUS ALLOYS

Following the procedure of Example 1, three alloys were dissolved in 8 N nitric acid. Each of these solutions were diluted to 1 liter, 25 ml. aliquots of the diluted solution were diluted to 150 ml. ten grams of sodium tartrate were dissolved in each 150 ml. diluted solution and the pH was adjusted to about 7 by the addition of 10% sodium hydroxide. The copper was precipitated from this solution by the addition of an excess of o-(p-tolylsulfonamido) aniline as a 0.5% solution in a 70:30 ethanol-water solvent mixture. The resulting precipitate was collected and was dried to constant weight. Table VI which follows gives the results of the determination of copper in these three alloys. In Table VI, column 1 gives the composition of the alloy and column 2 the percent copper found.

TABLE VI

| Copper base alloy composition: | Percent copper found |
|---|---|
| Aluminum base alloy | 2.50 |
|    Copper | 2.48 |
|    Manganese | 0.66 |
|    Nickel | 0.41 |
|    Chromium | 0.23 |
|    Iron | 0.2 |
|    Silica | 0.11 |
|    Zinc | 0.02 |
|    Titanium | 0.02 |
|    Aluminum | 94.26 |
|    Calcium | 0.01 |
|    Gallium | 0.01 |
|    Lead | 0.002 |
|    Vanadium | 0.001 |
| Zinc base alloy | 1.08 |
|    Copper | 1.08 |
|    Aluminum | 3.90 |
|    Magnesium | 0.04 |
|    Manganese | 0.02 |
|    Lead | 0.006 |
|    Nickel | 0.005 |
|    Tin | 0.005 |
|    Cadmium | 0.002 |
|    Zinc | 94.93 |
| Alloy | 72.09 |
|    Copper | 72.14 |
|    Zinc | 9.69 |
|    Iron | 0.053 |
|    Manganese | 0.02 |
|    Palladium | 0.02 |

Example 4

COLORIMETRIC DETERMINATION OF COPPER 566 mgs. of electrolytic copper were dissolved with gentle heating in 25 ml. of conc. nitric acid and 25 ml. of water, 10 ml. of perchloric acid were added and the solution was evaporated until fumes of perchloric acid appeared. The resulting acidic solution containing cupric ions and perchlorate ions was diluted with 10 l. of water to give a solution containing 56.6 p.p.m. of copper. 4 ml. of this solution were pipetted into a 25 ml. volumetric flask. 5 ml. of a 0.1% solution of o-(p-tolylsulfonamido) aniline were added followed by 8 ml. of colorless reagent-grade pyridine (the o-(p-tolylsulfonamido) aniline solution was prepared by dissolving 100 mg. of the compound in 100 ml. of 95% ethanol). After shaking, sufficient 95% ethanol was added to give a 25 ml. volume. This final solution contained 9 ppm of copper. The solution was allowed to stand for about 25 min. The absorbance of an aliquot of the solution at 455 mu against a blank solution of the same volume containing 5 ml. of a 0.1% solution of the reagent, 8 ml. of pyridine and sufficient 95% ethanol to give a 25 ml. volume was measured using a spectrophotometer. The optical density was 0.30 indicating a copper concentration of .226 mg. in the 4 ml. of the standard copper solution originally used.

A calibration curve was prepared by measuring the absorbance of 1, 2, 3, 5 6 and 7 ml. aliquots of the standard copper solution by the procedure just described. Table VII which follows lists the mls. of standard copper solution used, the amount of copper present in the aliquot and the optical density for each aliquot.

TABLE VII

| Ml. of standard cupric ion solution | Mgs. of copper present | Optical density at 455 p.p.m. |
|---|---|---|
| 1.00 | .057 | 0.07 |
| 2.00 | .113 | 0.14 |
| 3.00 | .170 | 0.22 |
| 4.00 | .226 | 0.30 |
| 5.00 | .283 | 0.37 |
| 6.00 | .340 | 0.44 |
| 7.00 | .396 | 0.52 |

The copper-o-(p-tolylsulfonamido) aniline complex obeys Beer's law in concentrations varying from 0–16 p.p.m.

o-(p-Benzenesulfonamido) aniline can be used in place of o-(p-tolylsulfonamido) aniline in the above example with comparable results.

Example 5

COLORIMETRIC DETERMINATION OF COPPER IN AN ALLOY 0.7411 g. of an alloy containing 72.4% copper, 17.9% nickel, 9.69% zinc, 0.053% iron, 0.020% manganese and 0.023% palladium were dissolved in 25 ml. of a solution prepared by diluting conc. nitric acid with an equal volume of water. The solution was diluted to a volume of 1000 ml. with distilled water and fifty ml. of this solution was diluted in turn to a volume of 500 ml. with distilled water. This last solution contains 74.11 p.p.m. of alloy. 3 ml. and 5 ml. aliquots of the solution were placed in 25 ml. flasks and each mixed with 5 ml. of a 0.1% solution of o-(p-tolylsulfonamido) aniline in 95% ethanol, 9 ml. of colorless reagent pyridine and sufficient 95% ethanol to give a final volume of 25 ml. The optical densities of these solutions were determined by the procedure of Example 4 and were found to be 0.21 and 0.35 respectively. From the calibration curve obtained by plotting the figures in Table VII, it was found that an optical density of 0.21 indicates that 0.16 mg. of copper were present in the 3 ml. aliquot and an optical density of 0.35 and that .268 mg. of copper were present in the 5 ml. aliquot. These concentrations correspond to initial copper concentrations of 53.33 mg. per liter and 53.60 mg. per liter, thus giving the percentage of copper in the alloy as 71.97% and 72.31% respectively. An average of these two figures is 72.14%.

Example 6

AMPEROMETRIC DETERMINATION OF COPPER 0.0868 g. of the copper alloy of Example 5 were dissolved in 10 ml. of a nitric acid solution prepared by diluting conc. nitric acid with an equal volume of water. The alloy solution was concentrated to about 5 ml. by evaporation to expel any nitrous acid. 50 ml. of distilled water were added, followed by 500 ml. of 0.3 molar sodium tartrate solution. The pH of the resulting solution was adjusted to about 7 with 10% sodium hydroxide and the volume was made up to 1 liter by the addition of 0.3 molar sodium tartrate. An aliquot of this final solution was placed in a titration cell. Air was removed from the solution by bubbling anhydrous nitrogen through it.

A .014 molar solution of o-(p-tolylsulfonamido) aniline in a solvent mixture made up of 3 parts of 95% ethanol to 2 parts of water was added from a microburet to the copper alloy-sodium tartrate solution while a —0.4 voltage (relative to the saturated calomel electrode) was applied across the latter solution. The galvanometer deflection in micro-amperes, was recorded before addition of the o-(p-tolylsulfonamido) aniline reagent and after each addition. Table VIII which follows gives the data from two amperometric titrations carried out with the above copper alloy solution with the o-(p-tolylsulfonamido) aniline reagent.

TABLE VIII

*Amperometric Titration of Copper Alloy*

| Titration 1 | | Titration 2 | |
| --- | --- | --- | --- |
| Ml. of .014 molar o-(p-toylsulfonamido) aniline reagent added | Micro-amperes | Ml. of .014 molar o-(p-tolylsulfonamido) aniline added | Micro-amperes |
| 0.00 | 9.01 | 0.00 | 8.80 |
| 0.30 | 6.66 | 0.20 | 6.84 |
| 0.50 | 6.46 | 0.40 | 6.65 |
| 0.70 | 6.21 | 0.52 | 6.45 |
| 0.96 | 5.80 | 0.60 | 6.26 |
| 1.16 | 5.49 | 0.82 | 5.92 |
| 1.40 | 5.19 | 1.06 | 5.20 |
| 1.60 | 5.17 | 1.26 | 5.35 |
| 1.80 | 5.19 | 1.46 | 5.18 |
| | | 1.66 | 5.19 |
| | | 1.86 | 5.19 |

Using the above data, titration curves were plotted. From the curves it was determined that the end-point occurred after 1.41 ml. of the reagent had been added. The end point was taken as the point at which the current remained unchanged upon further addition of o-(p-tolylsulfonamido) aniline reagent thus indicating complete removal of cupric ion as an insoluble complex with o-(p-tolylsulfonamido) aniline.

From this volume of reagent of .014 molarity plus the assumption that two molecules of o-(p-tolylsulfonamido) aniline chelate with each cupric ion, the amount of cupric ion present in the original 10 ml. aliquot was found to be .626 mg., giving a percentage of copper in the alloy of 72.11%.

Cupric ion concentrations as low as $5 \times 10.4$ molar can be determined by the above procedure.

o-(Benzenesulfonamido) aniline can be substituted for o-(p-tolylsulfonamido) aniline in the above determination.

*Example 7*

PREPARATION OF o-(p-TOLYLSULFONAMIDO) ANILINE REAGENT

One gram of o-(p-tolylsulfonamido) aniline was dissolved in 140 ml. of 95% ethanol to which was added 60 ml. of water, thus giving a 0.5% solution of o-(p-tolylsulfonamido) aniline.

Solutions of other strengths, such as 1% are prepared by varying the amount of o-(p-tolylsulfonamido) aniline in the above procedure.

The invention claimed is:

1. A complex copper compound containing two molecules of an N-(2-amino-hydrocarbyl) sulfonamide represented by one of the following structures:

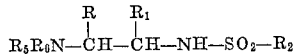

and

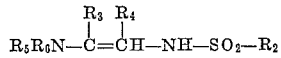

wherein R and $R_1$ are selected from the group consisting of hydrogen, lower alkyl, aryl and aryl substituted lower alkyl, $R_2$ is selected from the group consisting of alkyl, aromatic, and substituted aromatic and aryl-substituted alkyl, $R_3$ and $R_4$ taken together, are the atoms necessary to complete a carbocyclic aromatic ring system, $R_5$ is selected from the group consisting of hydrogen, lower alkyl, and aryl-substituted lower alkyl, $R_6$ is selected from the group consisting of hydrogen, lower alkyl, aryl-substituted lower alkyl, aromatic and substituted aromatic, and $R_5$ and $R_6$ taken together are a pentamethylene chain ring, chelated with one cupric ion.

2. The process of chelating cupric ions in solution which comprises contacting said solution with an N-(2-amino-hydrocarbyl) sulfonamide represented by one of the following formulas::

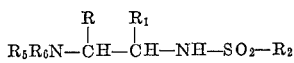

and

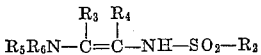

wherein R and $R_1$ are selected from the group consisting of hydrogen, lower alkyl, aryl and aryl substituted lower alkyl, $R_2$ is selected from the group consisting of alkyl, aromatic, and substituted aromatic and aryl-substituted alkyl, $R_3$ and $R_4$ taken together, are the atoms necessary to complete a carbocyclic aromatic ring system, $R_5$ is selected from the group consisting of hydrogen, lower alkyl, and aryl-substituted lower alkyl, $R_6$ is selected from the group consisting of hydrogen, lower alkyl, aryl-substituted lower alkyl, aromatic and substituted aromatic, and $R_5$ and $R_6$ taken together are a pentamethylene chain ring.

3. The complex copper compound of claim 1 in which the compound having an N-(2-amino-hydrocarbyl) sulfonamide grouping is an o-(sulfonamido) aniline.

4. The process which comprises adding an o-(sulfonamido) aniline to a solution containing cupric ions and then separating the thus formed cupric di-o-(sulfonamido) aniline precipitate.

5. A copper chelate represented by one of the following structures:

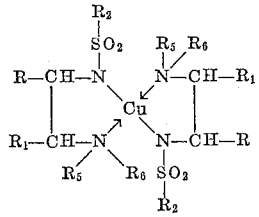

and

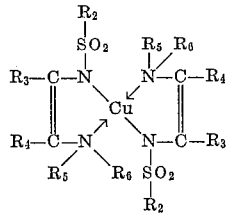

wherein R and $R_1$ are selected from the group consisting of hydrogen, lower alkyl, aryl and aryl substituted lower alkyl, $R_2$ is selected from the group consisting of alkyl, aromatic, and substituted aromatic and aryl substituted alkyl, $R_3$ and $R_4$ taken together, are the atoms necessary to complete a carbocyclic aromatic ring system, $R_5$ is selected from the group consisting of hydrogen, lower alkyl, and aryl-substituted lower alkyl, $R_6$ is selected from the group consisting of hydrogen, lower alkyl, aryl-substituted lower alkyl, aromatic and substituted aromatic, and $R_5$ and $R_6$ taken together are a pentamethylene chain ring.

6. Cupric di-o-(p-tolylsulfonamido) aniline.

7. Cupric di-o-(benzenesulfonamido) aniline.

8. The process of quantitatively separating cupric ions in solution from at least one additional ion selected from the group consisting of lithium, barium, sodium, potassium, mercury, cadmium, zinc, strontium, calcium, nickel, cobalt, chromium, magnesium, manganese, iridium, yttrium, beryllium, aluminum, lead, iron, thorium, tin, calcium, titanium, gallium, vanadium and palladium which comprises adding to said solution o-(p-tolylsulfonamido) aniline in an amount in moles of at least twice the molar amount of cupric ions present, and isolating the thus formed cupric di-o-(p-tolysulfonamido) aniline.

9. The process of quantitatively separating cupric ions in solution from at least one additional ion selected from the group consisting of lithium, barium, sodium, potassium, mercury, cadmium, zinc, strontium, calcium, nickel, cobalt, chromium, magnesium, manganese, iridium, yttrium, beryllium, aluminum, lead, iron, thorium, tin, calcium, titanium, gallium, vanadium, and palladium which comprises adding to said solution o-(benzenesulfonamido) aniline in an amount in moles of at least twice the molar amount of cupric ions present, and isolating the thus formed cupric di-o-(benzenesulfonamido) aniline.

References Cited in the file of this patent

UNITED STATES PATENTS

| | | |
|---|---|---|
| 2,911,425 | Scalera | Nov. 3, 1959 |
| 2,976,122 | Ertelt | Mar. 21, 1961 |

FOREIGN PATENTS

Collection of Czechoslovak Chemical Communications, vol. 24, 1959, (pages 3181–3183), Berndt et al.